Aug. 13, 1963  S. T. LEA  3,100,335
TIRE VALVE REMOVING TOOL
Filed March 20, 1961
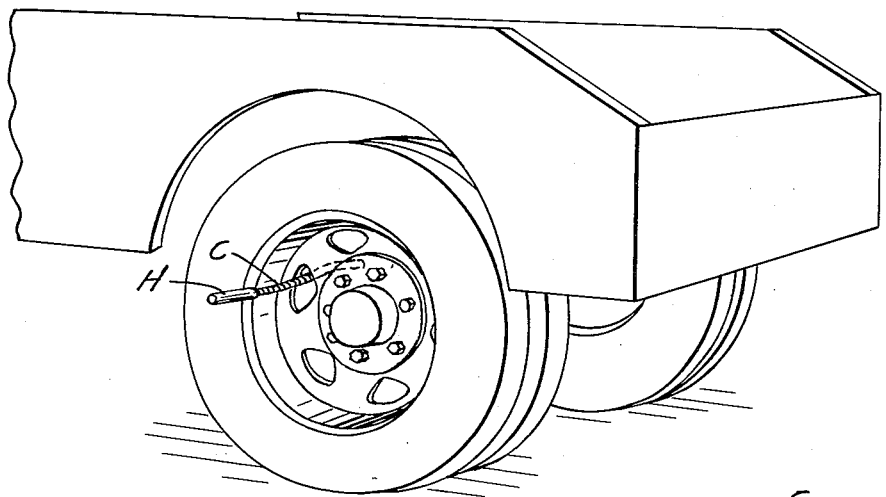
FIG. 1
FIG. 2
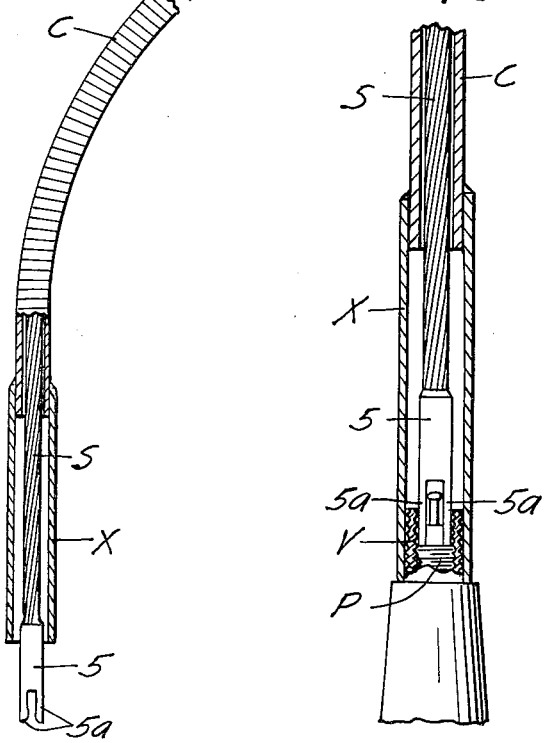
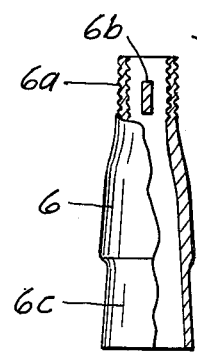
INVENTOR
STANLEY T. LEA
BY
*Williamson & Palmatier*
ATTORNEYS

United States Patent Office 3,100,335
Patented Aug. 13, 1963

3,100,335
TIRE VALVE REMOVING TOOL
Stanley T. Lea, Milan, Minn.
Filed Mar. 20, 1961, Ser. No. 96,861
3 Claims. (Cl. 29—221.5)

This invention relates to tools for removing conventional tire valve assemblies or cores, where the tubular valve stems of pneumatic tires or the like are conventionally disposed in relatively inaccessible positions, as in the dual tires for trucks, semitrailers and other automotive vehicles.

In automotive dual-wheel and tire constructions the disc walls of the dual wheel are provided with a series of circumferentially spaced apertures to give accessibility to the tubular valve stems of the two pneumatic tires disposed in side-by-side relation. The two tires are ordinarily equipped with dust caps which threadedly engage the stems and which must be removed before inflation of the tires. It often becomes necessary to remove and replace the check valve assemblies or cores of the tires and this is very difficult manually because of the limited accessibility provided by the said apertures.

It is an object of my invention to provide an efficient tool adapted to readily remove and replace the tire-valve-cores of difficultly accessible valve-stems such as are employed with dual wheels, and where the operator may apply torque and longitudinal movement to a core-engaging element through flexible driving connections by manipulation of a remote slide and turning handle.

A more specific object is the provision of a simple, inexpensive valve core removing tool which will enable the user to delicately apply a rotative action together with a longitudinal movement upon a suitably forked core-engaging head to "feel" and properly engage the lugs axially of the core while applying rotative force and longitudinal movement at a point removed from the valve stem and at various angles relative to the axis of the valve stem.

A further object is the provision of a tool of the class described which also permits engagement, grasping, turning and removal and replacement of conventional dust caps employed on the stems of dual tire valves and the like.

The prior art known to applicant has included some valve core removing tools, most of which are provided only for straight line movement of a projectible core-engaging head, and others of which require when flexible coupling or shafts are used, screw threaded engagement with an actuating head or member and in some instances, a screw thread engagement exteriorly of the valve stem. Such prior structures, to my knowledge, are not successful in application to the valves of dual tires.

With my improved structure, the user can bend a flexible tubular casing and an enclosed flexible shaft to conform properly to the requirements of an inaccessible valve stem on dual tires or the like, bringing the valve-core engagement element into substantially axial alignment with the valve core, and the user may thereafter, through a slide handle, simultaneously apply torque to the flexible shaft with gradual longitudinal movement to thus "feel" the upstanding lug of the core plug and make engagement therewith. I also provide a small adapter for ready connection to the valve-core-engaging element to bring about the grasping and subsequent turning for removal or replacement of a dust cap on a dual tire valve stem.

The foregoing and other objects of my inventions will be more apparent from the following description made in conjunction with the accompanying drawings wherein like reference characters refer to similar parts throughout the several views and in which:

FIG. 1 is a rear side elevation of the rear portion of a truck equipped with conventional dual wheels and tires; and showing application of my valve core removing tool with the tubular casing and flexible shaft bent to properly conform the working end of the tool to the valve stem of the inside dual tire;

FIG. 2 is a foreshortened view partly in side elevation and partly in longitudinal section showing an embodiment of my valve removing tool;

FIG. 3 is a fragmentary longitudinal section taken through the working end of my tool with the forked working end engaging in grasping the upwardly extending lug of a valve stem; and FIG. 4 is an exploded view partly in longitudinal cross section and partly in side elevation showing a simple adapter structure for making provision for removal and replacement of tire dust caps.

To impart torque and also longitudinal movement of the core-engaging member of my structure, an elongated flexible shaft S, such as is commonly employed in speedometer shafts is mounted coaxially in an elongated flexible conduit C. The rear end of flexible shaft S is rigidly secured as by heavy soldering or welding to the interior of a slide-cap handle H which has a closed outer end as shown and is freely slidable upon the outer end of the conduit C. The forward open end of slide-cap handle H is restricted at its periphery to engage a slight enlargement or bead formed exteriorly on the outer end of conduit C to prevent slidable displacement of the two parts.

At the forward end of conduit C and coaxial therewith a rigid sleeve X is rigidly secured as by welding or soldering, having a cylindrical, internal diameter for quite loosely sliding over the valve stem of a conventional pneumatic tire.

A valve-core-engaging member 5 is rigidly affixed in axial alignment to the forward end of the flexible shaft S and is preferably forked and made of spring material to slip over and grasp through the tines 5a of the fork, the projecting lug or lugs conventionally provided at the outer end of the threaded valve-core-plug P.

With the foregoing highly simplified construction an operator may readily bend the flexible conduit C and with it, the encased flexible shaft S to cause the working end of the tool to be inserted into a relatively inaccessible space such as through the aperture provided in the wheel disc of dual tires and with the working end of the tool axially aligned with the valve stem of either the inside dual tire or outside dual tire.

With one hand the rigid sleeve X may be held in proper coaxial relation and the sleeve may be slipped slightly over the valve stem V, thereby maintaining proper alignment of the core-engaging element 5. Then the operator, by gently feeling for the engagement point, turns the slide cap handle slowly while also longitudinally projecting the handle, and the flexible shaft rigidly affixed thereto, until the lug or lugs of the valve core are engaged by the two prongs or forks 5a. Then a rather sharp, short outward thrust is imposed upon the flexible shaft to properly grasp the same with the fork and thereafter the cap handle H is turned counterclockwise to remove the core or in clockwise direction to insert and threadedly attach a new valve assembly or core.

It will be understood (see FIG. 2) that the tines 5a of the valve-core-engaging member are constructed of spring material with the inner and opposed surfaces thereof spaced apart to be lightly tensioned and engage and grasp the outwardly projecting lugs on the outer end of the plug member P of the valve core. Thus, with the ability of shaft S to slide longitudinally relative to conduit C, manipulated by handle H for both sliding and rotation, the valve core may be engaged and grasped and the plug P unscrewed and bodily removed from the valve stem V. Likewise, a new valve core may be inserted by first securing the lugs of the plug member P between the tines 5a of the valve-core-engaging member, thereafter with the rigid sleeve X slipped over the stem of a tire valve, the new core may be threadedly engaged with the interior thread of the conventional valve stem V and the flexible shaft S turned through the slide handle H to engage and properly position a new valve assembly and core.

In FIG. 4 I illustrate another important function and operation of my tool for removing and reapplying a conventional dust cap of a conventional pneumatic tire through the employment of a simple adapter structure with the essential components of my tire-valve-removing tool previously described.

In FIG. 4 the conventional tubular valve stem V exteriorly threaded at its outer end, is equipped with a conventional dust cap D which is interiorly threaded to engage and be secured to valve stem V. The periphery of dust cap D is slightly tapered from its lower end to its closed end and provided with the usual longitudinal ribs to facilitate turning thereof.

I provide an adapter indicated as an entirety by the numeral 6, having an upper sleeve portion 6a adapted to freely slide over the forked end of the valve-core-engaging member 5, and diametrically disposed within said sleeve portion 6a is an upstanding rib or lug 6b diametrically disposed for engagement and frictional clamping by the tines 5a of the forked member 5. The adapter 6, at the forward end thereof, has an upwardly tapered sleeve 6c for telescopically fitting quite snugly, the tapered and ribbed periphery of the dust cap D.

Thus, with the adapter 6 attached to the working end of my tool on flexible shaft S, the dust cap on a pneumatic tire may be grasped through the same operation of the user, employing the rigid sleeve X with the fingers of one hand to properly align the working parts and the adapter sleeve 6c. Longitudinal movement of the slide handle H with subsequent turning of the shaft S through the handle unscrews the dust cap and tapered telescopic fitting is snug enough so that the cap is grasped and after unscrewing the same from valve stem V, the tool including conduit C may be withwdrawn, taking the dust cap with it. Likewise the dust cap may be reapplied and screwed into place on the valve stem V.

It is expressly to be understood that in place of the spring-tensioned, forked valve-engaging member 5, I may employ an appropriately shaped valve-core-engaging member employing a small permanent magnet which will not require the spring tines 5a for grasping and retaining the valve plug P.

From the foregoing description it will be seen that with a very minimum number of essential parts, I have provided a dual function tool for removing and replacing check-valve assemblies or cores in pneumatic tires of automotive vehicles, as well as for removing and reapplying dust caps on the sleeves. The structure employs no threaded or other connections between a flexible shaft and a flexible casing, but is constructed to facilitate careful longitudinal sliding action of the flexible shaft with attendant turning as desired so that an operator may actually "feel" engagement with the lug of a core plug P and thereafter, from a remote position and at various angles relative to the axis of the tire valve stem, apply torque to remove the valve core.

Through the great flexibility of the shaft S and conduit C and the instant control of longitudinal and torque movement upon the shaft S, my tool is adapted for application in the removal and replacement of valve cores or assemblies in dual tires and other otherwise inaccessible installations of tire valves.

It will of course be understood that various changes may be made in the form, details and arrangement of parts without departing from the scope of applicant's invention.

What is claimed is:
1. A valve-core-removing tool having in combination an elongate flexible shaft,
    a flexible tubular casing coaxially surrounding said shaft and being operatively interrelated therewith to permit relative rotative and longitudinal movement of said shaft with respect to said casing,
    a slide handle member affixed to the outer end of said shaft and mounted on the outer portion of said casing for longitudinal and rotative movement relative thereto,
    a forked valve-core-engaging member affixed to the working end of said shaft for snug engagement with the upstanding lug provided by a conventional tire-valve-core whereby said casing and shaft may be appropriately curved to effect substantial axial disposition of said forked engaging member with said valve core,
    a rigid sleeve member affixed to the outer end of said flexible conduit and being of a size for loosely sliding over the valve stem of a tire, said flexible shaft being extensible through said sleeve,
    said sleeve member having an internal diameter and having a length substantially greater than the cross-sectional area and length of said valve-core-gripping member to thereby permit retractable and extensible movement of said valve-core-engaging member into and out of said sleeve member whereby said sleeve member provides a means for finger-wise aligning the working end of the tool with the stem of a tire valve.

2. The structure set forth in claim 1 and a dust-cap-engaging adapter having an outer tubular end provided with an internal diameter for telescopically surrounding said valve-core-engaging member, and having within said tubular portion a lug for interlocking with said forked core-engaging member, and having at its outer end, a socket for telescopically and frictionally fitting the periphery of a conventional valve-dust cap.

3. A valve-core-removing tool having in combination an elongated flexible shaft, a flexible tubular casing coaxially surrounding said shaft and connected therewith for both rotative and longitudinal movement of said shaft in said casing, a slide handle member affixed to the outer end of said shaft and mounted on said casing for selective longitudinal and also rotative movement relative thereto, a valve-core-grasping member affixed to the forward end of said shaft for engagement with the outer end of the conventional tire-valve-core, and a rigid sleeve member affixed to the outer end of said flexible conduit and having an internal diameter for loosely sliding over the valve stem of a tire, said sleeve having an internal diameter and having a length substantially greater than the cross-sectional area and length of said valve-core-grasping member to permit retractable and extensible movement of said valve-core-grasping member into and out of said sleeve, said sleeve member thereby providing a means for finger-wise aligning the working end of the tool with the stem of a tire valve whereby said casing and shaft may be appropriately curved to effect substantially axial disposition of said core-grasping member with said valve stem.

References Cited in the file of this patent

UNITED STATES PATENTS

| | | |
|---|---|---|
| 2,073,903 | O'Neil | Mar. 16, 1937 |
| 2,495,040 | Walden | Jan. 17, 1950 |
| 2,709,383 | Davies | May 31, 1955 |
| 2,814,322 | Kupfrian | Nov. 26, 1957 |
| 2,968,090 | Cohrs et al. | Jan. 17, 1961 |